United States Patent Office 3,057,909
Patented Oct. 9, 1962

3,057,909
ESTERIFICATION OF TEREPHTHALIC ACID WITH AQUEOUS GLYCOL
Frederick J. Sebelist, Ridley Park, Pa., and Robert H. Weir, Pitman, N.J., assignors to E. I. du Pont de Nemours and Company, Wilmington, Del., a corporation of Delaware
No Drawing. Filed Oct. 12, 1960, Ser. No. 62,083
2 Claims. (Cl. 260—475)

The present invention relates to the preparation of glycol esters of terephthalic acid. More particularly the present invention relates to the preparation of bis($\beta$-hydroxyethyl) terephthalate and mono($\beta$-hydroxyethyl) terephthalate.

The aforementioned esters of terephthalic acid are intermediates for the preparation of polyethylene terephthalate polymers. For the preparation of high-quality polymers, i.e., film- and fiber-grade polymers, the intermediates must be extremely pure. Impurities containing either linkages have been found especially detrimental to polymer properties, i.e., compounds such as:

(I)
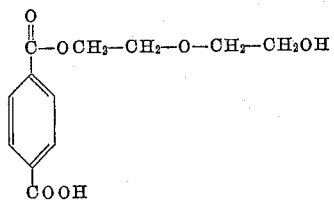

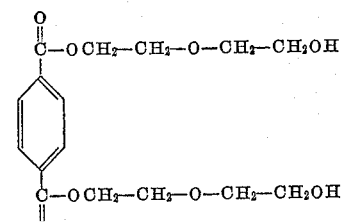

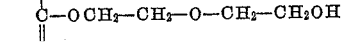

Prior art processes heretofore suggested for the direct esterification of terephthalic acid with ethylene glycol have all involved the formation of glycol ether impurities in a sufficient amount to seriously affect the properties of the polymer made from glycol terephthalate esters contaminated with such ether impurities. Moreover, the physical and chemical characteristics of the unwanted glycol ethers are such that separation from the terephthalate esters is extremely difficult, especially in the presence of low polymer of the said esters.

It is the principal object of the present invention to provide a process for the direct esterification of terephthalic acid with ethylene glycol to produce glycol terephthalate esters essentially free of impurities containing ether linkages. The uncontaminated terephthalate esters thus obtained may then be converted to polyethylene terephthalate polymers of high quality by known techniques.

We have discovered that terephthalic acid can be reacted directly with ethylene glycol to give a substantial conversion to bis($\beta$-hydroxyethyl) terephthalate while producing essentially no ether by-products when a critical amount of water is added to the reaction zone prior to the commencement of esterification. The deliberate addition of water to an esterification system is in direct contrast with prior art practice in which water of reaction is invariably removed to hasten and favor the completion of the esterification reaction.

The invention is illustrated by the following examples, which are intended as illustration only. Unless otherwise designated, all parts and percentages are by weight.

Example 1

In a stainless steel one-gallon autoclave equipped with a condenser and agitator, 200 parts of terephthalic acid, 745 parts of ethylene glycol and 82.8 parts of water were heated to 230° C. and held there for a period of 90 minutes under autogenous pressure of 400 p.s.i. ga. At the end of the reaction period, the contents of the autoclave were cooled to 90° C. and filtered to recover 8.4 parts of unreacted terephthalic acid. The filtrate was diluted with 3000 parts of cold water, allowed to crystallize at 0° C., and filtered. The filter cake after drying at 65° C. (213 parts) was slightly off-white in color and by analysis consisted of 128 parts of bis($\beta$-hydroxyethyl) terephthalate, 72 parts of mono($\beta$-hydroxyethyl) terephthalate, and the remaining 13 parts was primarily low polymer of terephthalate esters. The ether content of the solid ester product, calculated as diethylene glycol, was less than 0.01%.

Example 2

To illustrate the surprising effect of water on the formation of ether by-products, in accordance with the present invention, the above experiment was repeated except that the ratio of water was varied as shown in the table below. In all cases, the conversion of terephthalic acid to esters was greater than 95% and the ratio of bis- to mono-ester varied from 70/30 to 50/50. The formation of low polymer of terephthalate esters was 17% of the total esters when no water was added but only 6 to 8% of the total esters when 5% or more water was added.

| Water (as percent of the initial glycol-water solution) | Ether (as percent diethylene glycol in the ester product) |
|---|---|
| [1] 10 | <0.01 |
| 5 | 0.08 |
| 2 | 0.59 |
| 0 | 0.67 |

[1] Example 1 above.

Example 3

A mixture of 200 parts of terephthalic acid, 784 parts of ethylene glycol, and 61 parts of water in the autoclave described in Example 1 was heated to 240° C. and maintained at this temperature for a period of 125 minutes. At the end of the reaction period, the contents of autoclave were cooled to 90° C. to recover a clear, solids-free solution. This solution was diluted with 3000 parts of cold water and thereafter was worked up by the method of Example 1. Analysis of the dried solid product (234 parts) showed it to contain approximately 160 parts of bis($\beta$-hydroxyethyl) terephthalate and 74 parts of mono-($\beta$-hydroxyethyl) terephthalate. The ether content of the glycol terephthalates amounted to 0.21%, calculated as diethylene glycol.

Example 4

The procedure of Example 3 was followed, the autoclave charge being a mixture of 200 parts of terephthalic acid, 1512 parts of ethylene glycol, and 109 parts of water and the reaction period at 240° C. being 75 minutes. Analysis of the dried, nearly white solid product (227 parts) indicated it to contain approximately 124 parts of the bis($\beta$-hydroxyethyl) ester and 102 parts of the mono($\beta$-hydroxyethyl) ester of terephthalic acid. The ether content, on the above-described basis, was less than 0.01%.

As is readily apparent from the foregoing example, the present invention involves the surprising discovery that in the esterification of terephthalic acid with ethylene glycol, the addition of water to the reaction mass at the outset has a decidedly beneficial effect on the course of the reaction. This is directly contrary to classical esterification procedures. The esterification reaction:

(III) $\quad RCOOH + R'OH \rightarrow RCOOR' + H_2O$ is by no means a complete one. The water formed in the course of the reaction tends to react with the ester to hydrolyze it, i.e., to regenerate the original alcohol and acid. In order to drive the reaction toward the ester, the prior art teaches removal of the water from the system by a variety of techniques such as distillation, dehydration with sulfuric acid or anhydrous zinc chloride, etc. According to conventional esterification procedures, therefore, it is surprising to find a simple esterification process which is actually favored, i.e., benefited, by the presence of excess water in the system at the outset. It is nevertheless true that in the particular terephthalic acid/ethylene glycol esterification described above, the presence of extraneous water at the start of the reaction is beneficial in the sense that it unpredictably depresses the formation of unwanted ether by-products.

To obtain substantial conversion of terephthalic acid to esters by reaction with ethylene glycol while producing essentially no ether impurities, we have found that an initial weight ratio of water to ethylene glycol in the reaction zone varying from 5/95 to 15/85 is suitable. (These proportions correspond to a molar ratio of water to ethylene glycol varying from 0.2 to 0.6.) When the aqueous glycol contains less than 5% water, sufficient ether impurities are formed to seriously impair the quality of the polymers formed from the product esters. When the aqueous glycol contains more than about 15% water, the conversion is reduced and the ratio of bis- to mono-ester drops to less than 1/1. A water content in the initial aqueous glycol solution of 8–12% (i.e., a molar ratio of water to ethylene glycol of about 0.3 to 0.5) is preferred because in this concentration range, and under the conditions described below, greater than 90% of the terephthalic acid is converted to esters and the ratio of bis- to mono-ester is approximately 2/1 while the formation of ether by-products is negligible.

As is apparent from Example 2, water formed during the esterification will not in and of itself prevent the formation of ethers. To prevent ether formation it is essential that water be present at the start of the etherification reaction. On the other hand, water need not be removed during the course of the reaction, but the removal of water toward the end of the esterification in order to increase the conversion or shorten reaction time, etc., is within the scope of the present invention.

The molar ratio of ethylene glycol to terephthalic acid may be conveniently varied from about 5/1 to about 20/1. Ratios outside this range may be operable, but are generally to be avoided. At a glycol/terephthalic acid molar ratio less than about 5/1, the reaction slurry is difficult to agitate and the formation of low polymer is favored which significantly complicates the recovery of the ester product. At glycol/terephthalic acid molar ratios greater than 20/1, an excessive amount of glycol must be recovered for recycle which seriously impairs the economic feasibility of the process. The preferred glycol/terephthalic acid molar ratio is within the range of about 8/1 to 12/1.

Temperature for the esterification may vary from 200 to 280° C. Below 200° C. conversion to the bi-ester is depressed, while above 280° C., hydrolysis becomes a significant factor, condensation products increase, and decomposition of ethylene glycol becomes excessive. The preferred temperature range is about 225–250° C.

The reaction is carried out at a sufficiently elevated pressure to maintain the aqueous glycol solution in the liquid phase, for example, autogenous pressure or higher pressure. Autogenous pressures generally run in the range of about 250 to 1000 p.s.i. ga.

Reaction time is not generally a critical feature of the invention and will vary greatly from case to case depending upon the conditions selected. For example, in the absence of an esterification catalyst, reaction times of 50–150 minutes have been found quite adequate, with the preferred time falling in the range of 90 to 100 minutes. Under these circumstances, a reaction time less than 50 minutes generally adversely depresses the conversion while at a reaction time longer than 150 minutes, formation of condensation products becomes a significant problem. Under any given set of circumstances, suitable reaction periods for conducting the esterification will be readily apparent to those skilled in the art.

Terephthalic esters may be recovered from the reaction mixture by any of several means, which are conventional in the art and thus form no part of the present invention. For example, ester recovery by drowning in water has been exemplified. Esters may also be recovered by crystallization from the excess glycol, in which case the filtrate is recycled for further esterification with additional terephthalic acid. Another means is to remove some or all of the unreacted glycol by evaporation, preferably at reduced pressure.

The ester product may be purified for removal of small amounts of colored or color-forming impurities, if present, by any convenient means. For instance, the esters may be recrystallized from glycol or water, or glycol or aqueous solutions of the esters may be treated with adsorbents, such as activated carbon.

The terephthalic esters obtained from the direct esterification of terephthalic acid with aqueous ethylene glycol in accordance with the process of the present invention may be converted either to high-quality polymer or to pure bis-ester by various known techniques. For example, after removal of small amounts of color-forming impurities, the ester product may be polymerized directly to polyethylene terephthalate by conventional techniques since it is known that both the bis- and mono-esters may be so polymerized.

Under some circumstances, it will be desirable to utilize the process herein disclosed in conjunction with the process for the preparation of the bis-ester involving reaction of ethylene oxide with terephthalic acid. When the latter process is carried out in the presence of water, ethylene glycol is formed as a by-product. The by-product glycol may be used as a starting material for the ester synthesis of the present invention, and, if desired, the mono-ester in the ester product may be converted to the bis-ester by reaction with ethylene oxide prior to polymerization. Pure bis-ester may thus be obtained after separation from a minor amount of low polymer. Low polymer, on the other hand, may either be polymerized to polyethylene terephthalate or, if desired, may be saponified for the recovery of telephthalic acid and ethylene glycol.

While the examples describe a batch process, the same criteria are applicable to a continuous process for the esterification of terephthalic acid with aqueous ethylene glycol.

The present invention has been described in detail in the foregoing specification. It is intended that such modifications and alterations which will be readily apparent to those skilled in the art be considered as within the scope of this invention. Accordingly, we intend to be limited only by the following claims.

We claim:

1. A process for the esterification of terephthalic acid which comprises contacting the terephthalic acid with aqueous ethylene glycol at a temperature of about from 200 to 280° C. and at a pressure at least sufficient to maintain the aqueous glycol in the liquid phase, the molar ratio of water to ethylene glycol present at the start of the esterification being about from 0.2/1 to 0.6/1 and the molar ratio of ethylene glycol to terephthalic acid being about from 5/1 to 20/1.

2. A process of claim 1 wherein the esterification takes place at a temperature of about from 225 to 250° C., the molar ratio of water to ethylene glycol present at the start of the esterification is about from 0.3/1 to 0.5/1 and the molar ratio of ethylene glycol to terephthalic acid is about from 8/1 to 12/1.

References Cited in the file of this patent

UNITED STATES PATENTS

| | | |
|---|---|---|
| 2,802,858 | Stack et al. | Aug. 13, 1957 |
| 2,855,432 | Binder | Oct. 7, 1958 |
| 2,907,753 | Maclean et al. | Oct. 6, 1959 |